United States Patent
Sanner

(12) 
(10) Patent No.: US 6,843,681 B2
(45) Date of Patent: Jan. 18, 2005

(54) REPLACEMENT COVER HAVING INTEGRATED DATA PORTS FOR POWER PORT ASSEMBLY ON COMMERCIAL AIRCRAFT

(75) Inventor: Scott C. Sanner, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/010,243

(22) Filed: Dec. 6, 2001

(65) Prior Publication Data

US 2003/0106964 A1 Jun. 12, 2003

(51) Int. Cl.[7] .............................................. A47C 31/00
(52) U.S. Cl. .................................... 439/536; 297/217.3
(58) Field of Search ................................ 439/535, 536, 439/540.1; 174/66; 297/217.3

(56) References Cited

U.S. PATENT DOCUMENTS

| | | | |
|---|---|---|---|
| 3,019,050 A | * | 1/1962 | Spielman |
| 4,509,097 A | * | 4/1985 | Robinson |
| 5,114,365 A | * | 5/1992 | Thompson et al. ............ 174/66 |
| 5,384,428 A | * | 1/1995 | Luu .............................. 174/66 |
| 5,835,127 A | | 11/1998 | Booth et al. |
| 6,179,381 B1 | * | 1/2001 | Gevaert .................... 297/217.3 |
| 6,222,124 B1 | * | 4/2001 | Pritchard et al. ............. 174/66 |
| 6,249,913 B1 | | 6/2001 | Galipeau et al. |

FOREIGN PATENT DOCUMENTS

| WO | WO 00/14987 | 3/2000 |
|---|---|---|
| WO | WO 03/002409 | 1/2003 |
| WO | WO 03/047971 | 6/2003 |

* cited by examiner

*Primary Examiner*—Neil Abrams
(74) *Attorney, Agent, or Firm*—Harness Dickey & Pierce P.L.C.

(57) ABSTRACT

The present invention provides a replacement cover or faceplate for use with an existing power port assembly on a commercial aircraft that provides additional connectivity to on-board systems using portable electronic devices, while minimizing the need for recertification for installation. The replacement cover or faceplate is installed within the existing structure of the power port assembly using existing bracketing and attachment points. The cover allows access to an existing power port while providing a plurality of connectors for connection to on-board systems.

3 Claims, 3 Drawing Sheets

REPLACEMENT COVER HAVING INTEGRATED DATA PORTS FOR POWER PORT ASSEMBLY ON COMMERCIAL AIRCRAFT

FIELD OF THE INVENTION

The present invention relates generally to commercial aircraft, and more particularly to a replacement cover for a power port assembly to allow for connection of portable electronic devices to communicate with on-board systems.

BACKGROUND OF THE INVENTION

In commercial aircraft, it is typical to provide connectors as part of the passenger seats to access different on-board systems and services. For example, a headphone connector for connection to headphones may be provided to use in listening to on-board entertainment (e.g., preprogrammed music or audio accompanying movies). Further, as part of seatback telephones, integrated connectors for connection to portable computers for use in, for example, sending and receiving emails may be provided.

With the increased use of portable electronic devices, such as, for example, portable computers and personal digital assistants (PDAs), while in-transit, the need to provide additional services (e.g., Internet access) has become more important. For example, broadband communication services on-board commercial aircraft allowing two-way broadband data and entertainment are provided by the Connexion By Boeing[SM] system. Using this system, services, including the Internet, using their portable computer or other portable electronic device.

In order to access these services, new connectors for connection to the portable electronic devices must be provided. However, because the certification process for passenger seats is very costly and time consuming (i.e., 9–12 months), airline companies do not want to modify their passenger seats to install new system connectors (e.g., connectors for accessing the Connexion By Boeing[SM] system), thereby risking recertification. Therefore, a problem exists with respect to providing the required connectors for use by the passenger, while having the least amount of impact to the passenger seat and existing certification. In particular, it is desirable to provide the connectors on passenger seats in an aesthetically pleasing package, and in a package that provides ease of access, to thus encourage and facilitate usage of the connector.

Typically, recertification testing is required when the modification results in changing of the retention factors, attachment points and/or hardware. Thus, there exists a need to provide connectors for use with on-board systems that are installed using existing attachment points and hardware, and wherein the weight increase caused by the connector is insignificant so as to not invalidate previous testing results.

SUMMARY OF THE INVENTION

The present invention provides an interface for use on-board a commercial aircraft for connecting portable electronic devices to on-board systems. The interface is provided in combination with an existing PC Power connector (i.e., power port assembly) and includes a plurality of connectors. In one preferred embodiment, the interface is constructed as a replaceable cover or faceplate that utilizes existing bracketing and attachment points to provide the connectors. The installation increases the overall system weight of each passenger seat a minimal amount (i.e., about 1.5 pounds), and does not increase the weight of the passenger seat due to the removal of the old cover when installing a cover of the present invention. Thus, using the existing attachment points and hardware, the modification of the existing power port assembly to include integrated connectors according to the present invention does not require recertification testing because the added weight is insignificant.

Specifically, in combination with a power port assembly providing power to portable electronic devices while in transit on a mobile platform (e.g., commercial aircraft), an interface of the present invention includes a cover adapted for connection to the power port assembly and configured for attachment thereto within the existing structure of the power port assembly. The cover has provided therewith a plurality of connectors adapted for connection to portable electronic devices. Existing bracketing and attachment points (e.g. mounting holes) are used to connect the replacement cover to the power port assembly. Further, the cover is adapted for connection to existing connection members (e.g., fasteners) of the power port assembly.

The plurality of connectors are adapted for connection to portable electronic devices, such as, for example, a portable computer, for communicating with on-board systems. More particularly, the plurality of connectors may be configured for connection to an RJ type cable or a USB type cable. The connection is provided via an appropriate cable (e.g., standard telephone line or network cable). The power port assembly may be provided as part of a passenger seat on-board an aircraft, with the plurality of connectors accessible by a passenger within the passenger seat.

The present invention also provides a replacement cover for a power port assembly on a commercial aircraft having about the same dimensions as a cover being replaced, and includes an opening therein to allow access to an existing power port. The replacement cover includes a plurality of connectors integrally formed therewith and adapted for connection to portable electronic devices for communicating with systems on-board the commercial aircraft. The connectors may be configured for connection to different types of cables including, for example, an RJ type cable, a USB type cable or other network type cables.

The replacement cover further may include connection means adapted for use in connecting the replacement cover to existing fasteners. In one preferred embodiment, the replacement cover is preferably configured with a width of about five inches and a length of about three inches.

A method of retrofitting a commercial aircraft to provide connectors for connection with portable electronic devices to access on-board systems is also provided. The method includes removing an existing cover of a power port assembly and attaching a replacement cover adapted for connection using existing mounting members. The replacement cover has an opening therein for accessing a power port, and is provided with a plurality of connectors for connection to portable electronic devices for communicating with systems on-board the commercial aircraft The method further may include connecting appropriate wiring to the connectors based upon the connector type and using an existing communication box to provide wiring to the connectors. The connectors preferably are adapted for connection to different laptop computer interfaces.

Thus, the present invention provides a replacement cover and method of retrofitting a commercial aircraft, and in particular, an existing power port assembly, to provide connectors for use in connecting portable electronic devices to on-board systems (e.g., to access the Internet). The replacement cover allows access to the power port and uses existing bracketing and attachment points for connection to the power port assembly. Thus, recertification testing will not be required when using a replacement cover of the present invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although a cover of the present invention for use with a power port assembly on a commercial aircraft is configured with certain dimensions and described having specific connectors, other dimensions, configurations and connectors are contemplated depending upon the type of power port assembly and connections needed or desired.

Figure 1:
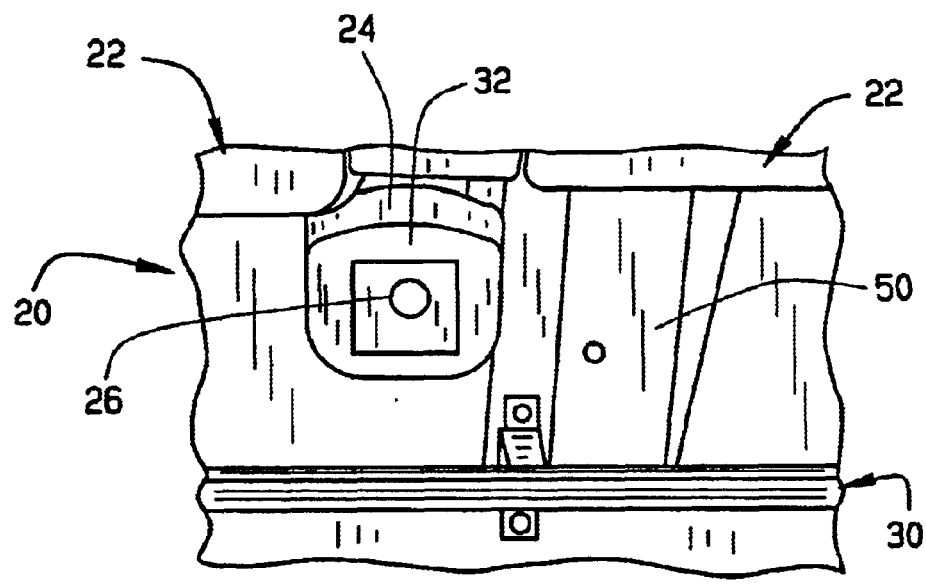
FIG. 1 is a front perspective view of a power port assembly in a commercial aircraft.
Figure 2:
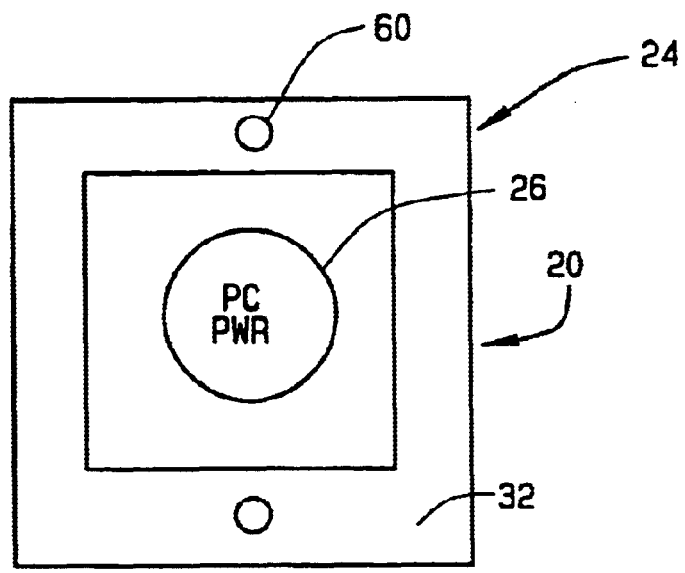
FIG. 2 is a plan view of a power port assembly in a commercial aircraft showing the existing cover of the assembly.

With respect to power port assemblies provided within commercial aircraft for powering portable electronic devices, such as portable computers and PDAs, this further may be understood with reference to FIGS. 1 and 2 by example. Thus, before further describing the invention, it is useful to understand power port assemblies provided within the main cabin of commercial aircraft for use by passengers to power portable electronic devices, and in particular the construction of such assemblies.

Figure 3:
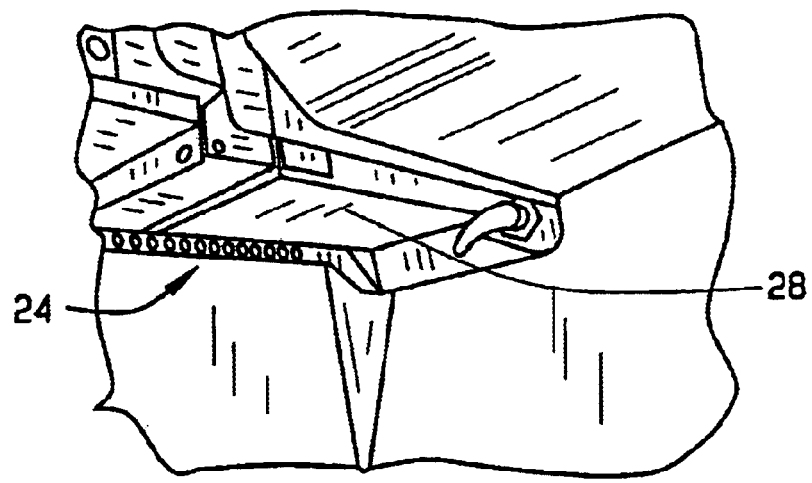
FIG. 3 is a bottom perspective view of a power box of the power port assembly.

Referring to FIGS. 1, 2 and 3, it is common in many of the Economy Class passenger seats in commercial aircraft to have power port assemblies installed as shown in FIGS. 1 and 2, and indicated generally by reference numeral 20. Connection of the power port assembly 20 to a passenger seat 22 is provided using fasteners, such as, for example, locking tie wraps (not shown). In particular, a power box 24, as shown in FIG. 1, and a power port 26 (e.g., cigarette type or 2 or 3 prong type), which may be concealed by an access cover 28, as shown in FIG. 3, when not is use, are secured to a front beam 30 under the passenger seat 22 to provide access by a passenger seated therein to a power supply. The power box 24 provides appropriate AC or DC power (e.g., 115V AC or 28V DC) depending upon system requirements. The power port 26 provides for connection to a portable electronic device to provide power from the power box 24 for operating the portable electronic device.

The power port assembly 20 is typically installed on commercial aircraft to provide service to one of the two, or two of the three passenger seats in an Economy Class seat group. However, power port assemblies 20 may be provided in other sections of the commercial aircraft. Essentially, the power port assembly 20 is installed (i.e., secured}, attached) under a seat bottom cushion of passenger seats 22 within the commercial aircraft. Thus, as shown in FIGS. 1 through 3, a typical power port assembly 20 includes a power box 24 (i.e. Power Converter), which converts aircraft AC voltage of 115/400 Hz to 115/60 Hz AC or 28 VDC, a passenger interface (i.e., power port 26), system wiring, bracketing and a cover/faceplate or shroud 32. The cover/faceplate conceals and protects the Power Port/outlet from liquid spills, food and accidental passenger damage when not in use.

Figure 4:
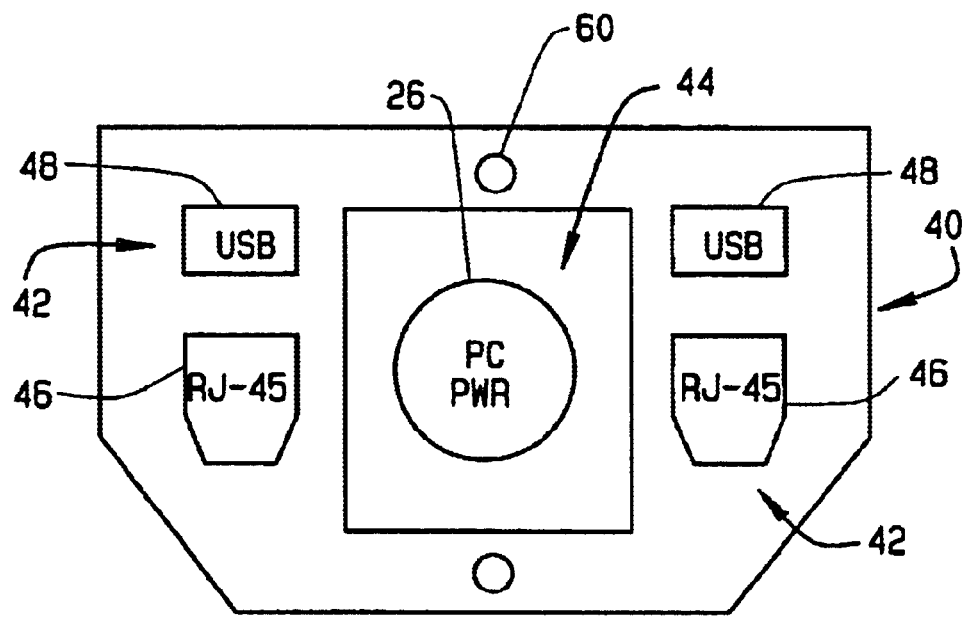
FIG. 4 is a plan view of a cover constructed according to the principles of the present invention for replacing the existing cover of the power port assembly.
Figure 5:
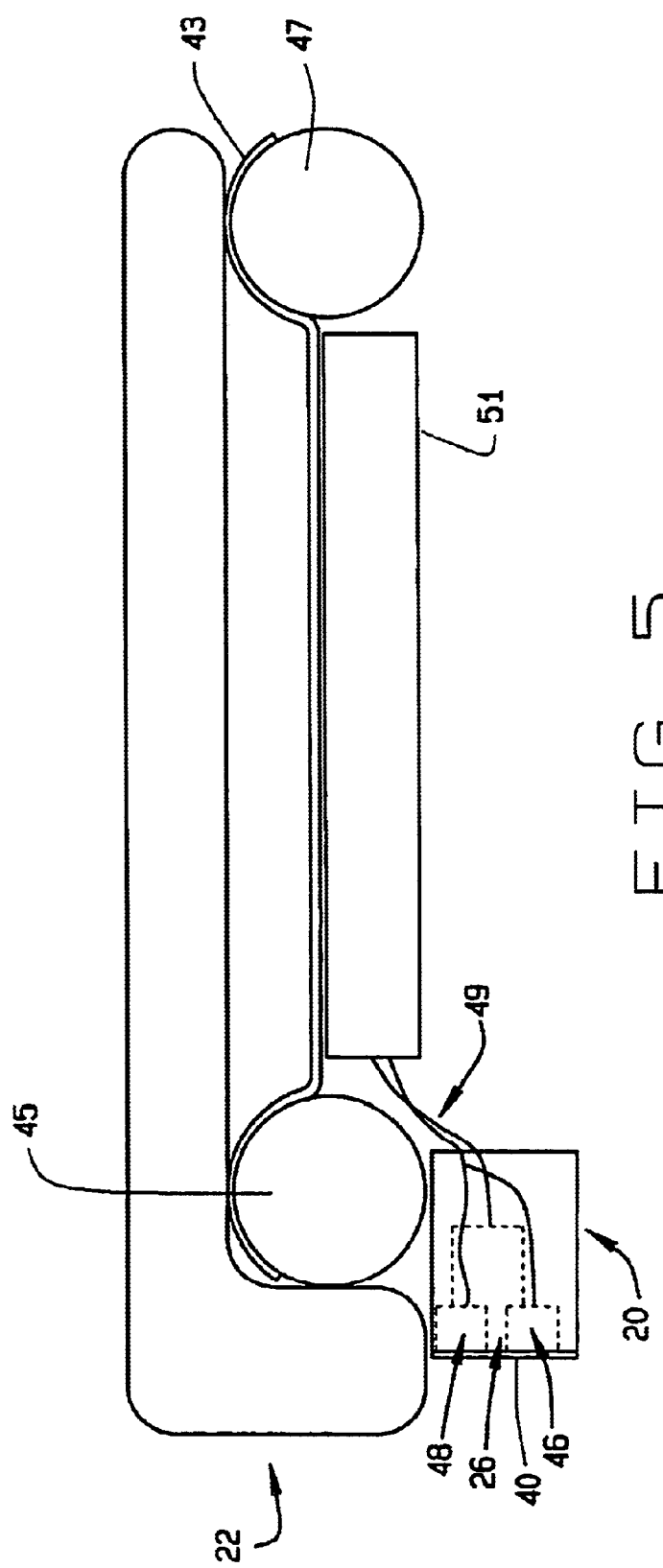
FIG. 5 is a side view of the cover of the present invention connected to a power port assembly that is attached under a seat.

Referring to FIGS. 4 and 5, having described an exemplary power port assembly 20 installed within commercial aircraft to provide power to portable electronic devices used by passengers within the aircraft, the present invention provides a replacement cover 40 to provide additional connectivity for portable electronic devices to access services (e.g., enhanced services such as the Internet) provided by on-board systems.

The replacement cover 40 uses the existing space and structure of the power port assembly 20 to allow for connection to on-board systems. In particular, the replacement cover 40 replaces the existing cover/faceplate or shroud 32 and may be mounted using the existing bracketing and attachment points as shown in FIG. 4. Essentially, the replacement cover 40 is installed in place of the cover/faceplate or shroud 32 and incorporates (i.e., allows access) to the existing power port 26 and provides connectors 42 for connection to on-board systems (e.g., Connexion By Boeing[SM]). It should be noted that the power port assembly 20 is installed using a plate bracket 43, shown in FIG. 5, that spans the seat beams (i.e., forward seat tube 45 and aft seat tube 47) and is held in place using, for example, nylon tie straps or bolts/screws (not shown). The power port assembly 20 attaches to the plate bracket 43.

Specifically, the replacement cover 40 is constructed according to the requirements of the particular power port assembly 20, and in particular, the dimensions of the cover/faceplate or shroud 32 to be replaced. In one preferred embodiment, the replacement cover or faceplate 40 is spring loaded and has the following approximate dimensions: five inches wide by three inches high. It should be noted that the dimensions of the faceplate may be modified based upon the size and orientation of the connectors, as well as the particular passenger seat 22 configuration. The replacement cover 40 includes an opening 44 for accessing the existing power port 26. An access cover (not shown) may be provided to conceal the power port 26 when not is use. In this embodiment, two RJ-45 connectors 46 and two USB connectors 48 are provided for use in connecting portable electronic devices to on-board systems. Appropriate wiring or cables are included to provide connectivity from the connectors 42 to the on-board systems as required. It should be noted that other connectors 42 may be provided instead of or in addition to the connectors 42 as shown in FIG. 4, and include, for example, RJ-11 and mini USB connectors.

With respect to installing the replacement cover 40, existing bracketing and attachment points 60 (e.g., mounting holes) are used to connect the replacement cover 40 to the power port assembly 20 to provide the connectors 42 for accessing on-board systems. Such connection members 60 are standard and well known in the art. Wires or cables 49 from on-board systems are preferably routed from the aircraft cable raceway through an existing Seat Electronics Box 50, shown in FIG. 1, along the seat frame into an In-Seat Power Converter 51, shown in FIG. 5, mounted horizontally on the plate bracket 43 attached to the forward and aft seat tubes 45, 47. If an Inflight Entertainment System (IFE) is not installed in the passenger seats 22 to which the replacement cover 40 is to be provided, the wires or cables are routed from the aircraft cable raceway along the seat structure as inconspicuously as possible to prevent passenger damage.

Thus, the present invention provides a replacement cover 40 and method of retrofitting a commercial aircraft that provides additional connectors for connection to on-board audio, video or digital information services, and uses existing brackets and attachment points for installation. The replacement cover 40 allows for access to an existing power port 26 of the power port assembly 20.

Although the application of the present invention as disclosed herein is generally directed to a replacement cover 40 having specific dimensions and connectors provided therewith, it is not so limited, and the replacement cover 40 may be configured according to the dimensions of the existing power port assembly 20 and accompanying cover/faceplate or shroud 32. The replacement cover 40 also may include additional or different connectors 42 depending upon the requirements of the on-board systems The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for retrofitting a power port assembly on board an aircraft to accommodate additional connectivity for communicatively connecting a portable electronic device to an on-board service system, said method comprising:

removing a face plate from a power port box connected to an aircraft passenger seat, the face plate providing access to a power port housed within the power port box;

connecting an on-board service system data communications cable routed within a cable box to a data port integrally formed with a replacement cover that includes an opening for providing access to the power port; and coupling the replacement cover to the power port box in a spring loaded manner such that the data communications cable is enclosed within the power port box, thereby enabling a passenger to connect a portable electronic device to the data port in order to communicatively connect the on-board service system.

2. The method of claim 1, the method further comprising:

connecting a plurality of on-board service system communications cables routed within the cable box to a plurality of data ports integrally formed with the replacement cover; and coupling the replacement cover to the power port box in a spring loaded manner such that communications cable is enclosed within the power port box, thereby enabling at least one user to connect a portable electronic device to one of the data ports in order to communicatively connect the on-board service system.

3. The method of claim 2, wherein the data ports are adapted for connection to a plurality of electronic device interfaces.

* * * * *